United States Patent Office 2,881,046
Patented Apr. 7, 1959

2,881,046

PROCESS FOR REACTING PROTEIN FIBERS WITH DICARBOXYLIC ACID DIAZIDES AND PRODUCTS PRODUCED THEREBY

William Gordon Rose and Harold P. Lundgren, Berkeley, Calif., assignors to the United States of America as represented by the Secretary of Agriculture No Drawing. Application March 29, 1956
Serial No. 574,932

12 Claims. (Cl. 8—127.6)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the chemical modification of proteinous fibers, especially wool. More particularly, the invention concerns the treatment of such fibers with dicarboxylic acid azides whereby to produce fibers which are altered in an advantageous direction. The objects of the invention are concerned not only with the processes whereby such chemical modifications are produced but also with the novel modified protein fibers produced by such chemical action. Further objects, features and advantages of the invention will be evident from the following description.

In essence, the process of the invention involves reacting a protein fiber with a dicarboxylic acid azide. This reaction involves contacting the fiber with the azide. Usually in order to obtain optimum contact of the azide with the fiber, the azide is dissolved in a suitable inert volatile organic solvent as, for example, ethyl ether, propyl ether, chloroform, carbon tetrachloride, methylene dichloride, ethylene dichloride, trichlorethylene, perchlorethylene, benzene, toluene, and so forth. The reaction may, in general be conducted in the temperature range from about 0° to about 100° C. In many cases to avoid any damage of the protein fiber, it is preferred to limit the upper temperature to about 60° C. Usually for convenience the reaction is carried out at about room temperature. The degree of modification of the protein fibers is influenced by the proportion of azide taken up by the fiber, that is, the higher the uptake of azide the greater will be the modification of the fiber. In general, the uptake of azide may be varied from about 0.1% to 25% of the weight of the fiber. In conducting the reaction the azide reagent is generally employed in excess over the amount desired to be taken up by the fiber in order to increase the rate of reaction. The time of reaction will vary depending on the temperature of reaction, the reactivity of the azide selected, and the degree of modification desired. In general, the reaction may take anywhere from a few minutes to 24 hours or more. It is obvious that such treatment conditions as concentration of azide, time and temperature of reaction are not critical but may be modified to suit individual circumstances without changing the basic nature of the invention.

Typical examples of dicarboxylic acid azides which may be used in accordance with this invention are listed below.

Oxazide,
Malonazide,
Succinazide,
Glutarazide,
Adipazide,
Pimelazide,
Suberazide,
Azelazide,
Sebacazide,
Decane dicarboxylic acid azide,
Brassylic acid azide,
Dodecane dicarboxylic acid azide,
Tridecane dicarboxylic acid azide,
Tetradecane dicarboxylic acid azide,
Alpha methyl adipazide,
Alpha, alpha dimethyl adipazide,
Fumarazide,
Maleiazide,
Itaconazide,
Citraconazide,
Mesaconazide,
Gamma methyl itaconazide,
Alpha, alpha dimethyl itaconazide,
Glutaconazide,
Hydromuconazide,
Phthalazide,
Isophthalazide,
Terephthalazide,
The azide of phenylacetic acid-ortho-carboxylic acid, i.e., $N_3CO—C_6H_4—CH_2—CON_3$
Hexahydrophthalazide,
Hexahydroisophthalazide,
Hexahydroterephthalazide,
Diglycollazide, that is, $N_3CO—CH_2—O—CH_2—CON_3$,
The azide of carboxyphenoxy benzoic acid, i.e., $N_3CO—CH_2—O—C_6H_4—CON_3$.

The azide reagents which may be used in this process can be represented by the formula:

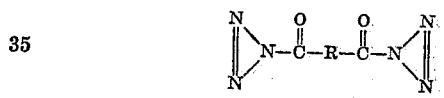

wherein R represents a member selected from the group consisting of a direct linkage between the two azide radicals, a saturated aliphatic hydrocarbon radical containing from 1 to 14 carbon atoms inclusive, an unsaturated aliphatic hydrocarbon radical containing from 2 to 5 carbon atoms inclusive, the benzene radical —$C_6H_4$—, the methylbenzene radical —$CH_2$—$C_6H_4$—, the cyclohexane radical —$C_6H_{10}$—, the radical

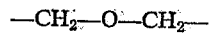

and the radical $CH_2—O—C_6H_4$—.

After the reaction of the fiber with the azide, the chemically modified fiber is mechanically treated as by wringing, centrifuging, or the like to remove excess reagent and solvent. Residual, unreacted azide is then removed from the fiber by washing with an inert solvent such as benzene, acetone, carbon tetrachloride, ethylene dichloride, etc. In many cases it is preferred to also wash the reacted fiber with alcohol and water to remove hydrolysis products or other undesired materials. The treated fiber is then dried in the usual way.

By treating the protein fibers with the azide reagent as above described, the fiber is chemically modified because there is a chemical combination between the azide and the protein. It is believed that the chemical reaction which occurs involves a cross-linking, that is, protein molecules are joined to one another through the dicarboxylic acid azide. That cross linking occurs is borne out by the fact that the chemically modified fibers display, in most instances, a decreased degree of supercontraction. Thus the chemically modified fibers when subjected to reducing agents which are capable of splitting disulphide bonds, contract to a much smaller extent than do the original fibers under the same circumstances. In addition, in some cases, the chemically modified fibers display a decreased tendency to shrink when subjected to laundering procedures. In this regard, succinazide displays an outstanding ability to produce a modified wool having good shrink resistant properties. Also in most cases, the azide-reacted fibers exhibit greater resistance to alkaline and acid reagents as indicated by their decreased solubility in these reagents. This factor enables the modified fibers to be useful in applications where the products would come into contact with alkaline or acid materials. A further point is that the azide treatment in accordance with the invention does not impair the fibers for their intended purposes, that is, for producing woven or knitted textiles, garments, etc. Thus the azide treatment does not adversely affect tensile strength, hand, or color. With regard to the last item, the modified fibers are usually whiter than the original fiber.

The process of the present invention is applicable generically to proteinous fibers whether they are in the form of fibers, as such, or in the form of thread, yarns, sliver, knitted or woven goods. The invention is particularly adapted to the treatment of wool but may also be applied to other proteinous fibers such as silk, fur, mohair, other fibers from fleece-bearing animals, human hair, animal hair, synthetic fibers made from casein, zein, peanut protein, soybean protein, keratin, etc.

The invention is further demonstrated by the following examples:

A series of experiments were carried out, each in the following way: A ten-gram sample of wool was placed in a solution of 5 grams of azide dissolved in a mixture of 50 cc. methylene chloride and 250 cc. carbon tetrachloride. The wool was held in the solution at 50° C. for 20 hours. The wool was then removed, squeezed dry, washed successively with carbon tetrachloride, alcohol, and water, then dried.

The uptake of azide by each wool sample was determined. Also, the treated wool samples and samples of the untreated wool (control) were subjected to various tests as described below to measure the effectiveness of the chemical modification.

Acid solubility—determined by immersing the wool in 4 N HCl for one hour at 65° C.

Alkali solubility—determined by immersing the wool in 0.1 N sodium hydroxide for one hour at 65° C.

Shrinkage—determined by subjecting the wool to a standard laundering procedure, followed by measurement of the area of the wool.

Degree of supercontraction—determined by measuring the length of the wool fiber before and after being immersed in 5% sodium bisulphite at 100° C. for one hour. The supercontraction is the percentage proportion of (a) the decrease in length after treatment with the disulphide bond-breaking reagent to (b) original length of the fiber. Thus this property of the wool is an index of cross-linking of the protein molecule—the less the contraction after treatment with the reducing agent, the greater is the degree of cross-linking.

The reagents used and the results obtained are set forth in the following table.

| Azide used | Uptake of azide, percent | Super-traction, percent | Area shrinkage, percent | Alkali solubility, percent | Acid solubility, percent |
|---|---|---|---|---|---|
| None (control) | Zero | 24 | 44 | 12 | 10 |
| Oxazide | 2.3 | 25 | 44 | 16 | 8 |
| Malonazide | 4.2 | 21 | 53 | 10 | 7 |
| Succinazide | 8.7 | 3 | 24 | 13 | 10 |
| Glutarazide | 6.7 | 0.9 | 31.4 | 7.2 | 6.0 |
| Adipazide | 7.4 | 2.5 | 31.7 | 6.7 | 7.5 |
| Suberazide | 7.7 | 18.9 | 27.3 | 10.5 | 11.4 |
| Diglycollazide | 9.2 | 10 | 44 | 7.3 | 6 |
| Phthalazide | ¹0 | 20 | 32.4 | 19 | 8.8 |
| Fumarazide | 3.3 | 14 | 35.1 | 11.2 | 9.4 |

¹ A positive uptake of phthalazide by the wool was obtained in this case. However, due to solution of wool constituents in the reaction solution or experimental error an apparent uptake of zero was foun..

The effect of chemical modification on the mechanical properties of woolen knitting yarn that had been treated with various azides, in the manner described, is given in the following table. The mechanical properties were measured in accordance with the specifications of ASTM test D1285, with a 10 inch gage length, and elongation at the rate of 12 inches per minute.

| Azide used | Uptake of azide, percent | Breaking force, grams | Initial modulus, grams | Elongation at break, percent |
|---|---|---|---|---|
| None (control) | 0 | 1,099 | 13,030 | 13.36 |
| Glutarazide | 6.7 | 1,063 | 14,250 | 12.62 |
| Adipazide | 7.4 | 1,138 | 15,450 | 13.08 |
| Suberazide | 7.7 | 1,181 | 16,125 | 15.57 |
| Diglycollazide | 8.3 | 1,138 | 14,655 | 13.50 |

Having thus described the invention, what is claimed is:

1. A process for modifying a protein fiber which comprises reacting a protein fiber with a dicarboxylic acid diazide, in solution in a volatile, organic, inert solvent, at a temperature about from 0 to 100° C., until the protein fiber combines with about from 0.1 to 25% of its weight of the said diazide to produce a modified protein fiber exhibiting decreased degree of supercontraction, decreased tendency to shrink, and increased resistance to alkalis and acids, said dicarboxylic acid diazide having the formula

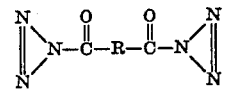

wherein R represents a member selected from the group consisting of a direct linkage between the two azide radicals, a saturated aliphatic hydrocarbon radical containing from 1 to 14 carbon atoms inclusive, an unsaturated aliphatic hydrocarbon radical containing from 2 to 5 carbon atoms inclusive, the benzene radical —$C_6H_4$—, the methylbenzene radical —$CH_2$—$C_6H_4$—, the cyclohexane radical —$C_6H_{10}$—, the radical

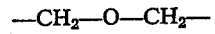

and the radical —$CH_2$—O—$C_6H_4$.

2. The process of claim 1 wherein the dicarboxylic acid diazide is the diazide of succinic acid and the protein fiber is wool.

3. The process of claim 1 wherein the dicarboxylic acid diazide is the diazide of glutaric acid and the protein fiber is wool.

4. The process of claim 1 wherein the dicarboxylic acid diazide is the diazide of diglycollic acid and the protein fiber is wool.

5. The process of claim 1 wherein the dicarboxylic acid diazide is the diazide of adipic acid and the protein fiber is wool.

6. The process of claim 1 wherein the dicarboxylic acid diazide is the diazide of fumaric acid and the protein fiber is wool.

7. A modified protein fiber comprising a protein fiber having chemically combined therewith about from 0.1 to 25% of its weight of a dicarboxylic acid diazide, produced by reacting said protein fiber with said dicarboxylic acid diazide at a temperature about from 0 to 100° C., said modified protein fiber exhibiting decreased degree of supercontraction, decreased tendency to shrink, and increased resistance of alkalis and acids, said dicarboxylic acid diazide having the formula

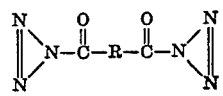

wherein R represents a member selected from the group consisting of a direct linkage between the two azide radicals, a saturated aliphatic hydrocarbon radical containing from 1 to 14 carbon atoms inclusive, an unsaturated aliphatic hydrocarbon radical containing from 2 to 5 carbon atoms inclusive, the benzene radical —$C_6H_4$—, the methylbenzene radical —$CH_2$—$C_6H_4$—, the cyclohexane radical —$C_6H_{10}$—, the radical $$-CH_2-O-CH_2-$$

and the radical —$CH_2$—O—$C_6H_4$.

8. The product of claim 7 wherein the dicarboxylic acid diazide is the diazide of succinic acid and the protein fiber is wool.

9. The product of claim 7 wherein the dicarboxylic acid diazide is the diazide of glutaric acid and the protein fiber is wool.

10. The product of claim 7 wherein the dicarboxylic acid diazide is the diazide of diglycollic acid and the protein fiber is wool.

11. The product of claim 7 wherein the dicarboxylic acid diazide is the diazide of adipic acid and the protein fiber is wool.

12. The product of claim 7 wherein the dicarboxylic acid diazide is the diazide of fumaric acid and the protein fiber is wool.

References Cited in the file of this patent

UNITED STATES PATENTS

| | | |
|---|---|---|
| 2,284,895 | Hanford et al. | June 2, 1942 |
| 2,482,578 | Doggett et al. | Sept. 20, 1949 |
| 2,529,512 | Ott | Nov. 14, 1950 |

FOREIGN PATENTS

| | | |
|---|---|---|
| 878,681 | France | Oct. 26, 1942 |
| 961,756 | France | Nov. 28, 1949 |